United States Patent
Sauve et al.

(10) Patent No.: US 7,873,915 B2
(45) Date of Patent: Jan. 18, 2011

(54) SUPPRESSING DIALOG BOXES

(75) Inventors: Aaron J. Sauve, Seattle, WA (US); Li-Hsin Huang, Bellevue, WA (US); Tony E. Schreiner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 11/424,809

(22) Filed: Jun. 16, 2006

(65) Prior Publication Data

US 2007/0294627 A1    Dec. 20, 2007

(51) Int. Cl.
*G06F 3/048* (2006.01)

(52) U.S. Cl. ............... 715/808; 715/764; 715/777; 715/809

(58) Field of Classification Search .......... 715/808, 715/809, 764, 777
See application file for complete search history.

(56) References Cited

U.S. PATENT DOCUMENTS

| | | | |
|---|---|---|---|
| 4,833,802 A | 5/1989 | Volkert | |
| 5,918,239 A | 6/1999 | Allen et al. | |
| 6,005,575 A * | 12/1999 | Colleran et al. | 715/807 |
| 6,518,983 B1 * | 2/2003 | Grohmann et al. | 715/781 |
| 6,728,960 B1 | 4/2004 | Loomans | |
| 6,757,716 B1 | 6/2004 | Blegen et al. | |
| 6,778,194 B2 | 8/2004 | Jones | |
| 6,925,459 B2 | 8/2005 | Cornell et al. | |
| 6,978,473 B1 | 12/2005 | Nsonwu et al. | |
| 7,010,757 B2 | 3/2006 | Stana et al. | |
| 7,017,119 B1 * | 3/2006 | Johnston et al. | 715/777 |
| 2002/0166000 A1 * | 11/2002 | Rossi et al. | 709/328 |
| 2004/0125149 A1 * | 7/2004 | Lapidous | 345/808 |
| 2004/0141011 A1 | 7/2004 | Smethers et al. | |
| 2004/0189712 A1 * | 9/2004 | Rundell | 345/808 |
| 2005/0004844 A1 | 1/2005 | Attia | |
| 2005/0055405 A1 * | 3/2005 | Kaminsky et al. | 709/206 |
| 2005/0055412 A1 * | 3/2005 | Kaminsky et al. | 709/207 |
| 2005/0066290 A1 * | 3/2005 | Chebolu et al. | 715/808 |
| 2005/0246659 A1 * | 11/2005 | Mengerink et al. | 715/808 |
| 2006/0190831 A1 * | 8/2006 | Kelso et al. | 715/764 |
| 2006/0253792 A1 * | 11/2006 | Grace et al. | 715/771 |
| 2006/0271858 A1 * | 11/2006 | Yolleck et al. | 715/738 |
| 2006/0271861 A1 * | 11/2006 | Yolleck et al. | 715/760 |
| 2007/0083813 A1 * | 4/2007 | Lui et al. | 715/709 |

OTHER PUBLICATIONS

Dan Costa, Software Review—Mozilla Firefox 1.0 review, Nov. 10, 2004, ZDNet.co.uk, pp. 1-3.*
"Google Toolbar Help", www.google.com/support/toolbar/bin/static.py?page=features.html&hl=en.
"Firefox", www.mozilla.com/firefox/.
"PopUpCop documentation—Customize Popups", www.popupcop.com/help/help7_options_popups.html.
"Super Ad Blocker Blocking Technologies", www.superadblocker.com/product_sabblocking.html#POPUPBlocker.

* cited by examiner

*Primary Examiner*—Dennis-Doon Chow
*Assistant Examiner*—Shen Shiau

(57) ABSTRACT

A method for browser software with a tabbed interface to suppress, or delay, the display of a dialog box that is initiated by an inactive, or background, tab. An indication may be provided to the user that a dialog box needing user attention may be provided. When that tab becomes active, and the web page on that tab becomes visible, the dialog box is then displayed. This suppression method may be applied to a variety of application programs.

12 Claims, 7 Drawing Sheets

FIG 3

SUPPRESSING DIALOG BOXES

TECHNICAL FIELD

This description relates generally to application programs and more specifically to browser software.

BACKGROUND

Browser application programs are often used to access information through the Internet or through company intranets. Users often have multiple pages displayed at any time. These pages may be from one web site, or from multiple web sites. To facilitate switching between multiple pages, tabbed browsers may be used.

Tabbed browsers generally allow programs on undisplayed web pages to continue processing while the tab holding that web page is inactive. This sometimes leads to items such as dialog boxes or other user interface elements to be presented to the user that are generated from web pages that are not currently being used, thus interrupting the user from his or her browsing experience in the web page currently being viewed.

For example, a page the user is not currently viewing may pop up a dialog box asking for a user name and password and the user may think the dialog box is from the currently active tab. This could lead to incorrect information being entered, or worse, a malicious site gaining access to valid username and password information for another site. Aside from those kinds of risks, it typically leads to a poor user experience to have dialog boxes from inactive tabs displayed, interrupting what the user is doing on the currently active, and viewed web page. Alternatively, a browser may switch tabs to one that is trying to display a dialog box. This may also lead to a poor user experience, since the user may not notice that the active tab has changed.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example may provide a way for browser software with a tabbed interface to suppress, or delay, the display of a dialog box that is initiated by an inactive, or background, tab. An indication may be provided to the user that a dialog box needing user attention may be provided. When that tab becomes active, and the web page on that tab becomes visible, the dialog box is then displayed. This suppression method may be applied to a variety of application programs.

Many of the attendant features may be more readily appreciated as the same becomes better understood by reference to the following detailed description considered in connection with the accompanying drawings.

DESCRIPTION OF THE DRAWINGS

The present description may be better understood from the following detailed description read in light of the accompanying drawings, wherein.

Like reference numerals are used to designate like parts in the accompanying drawings.

DETAILED DESCRIPTION

Figure 1:
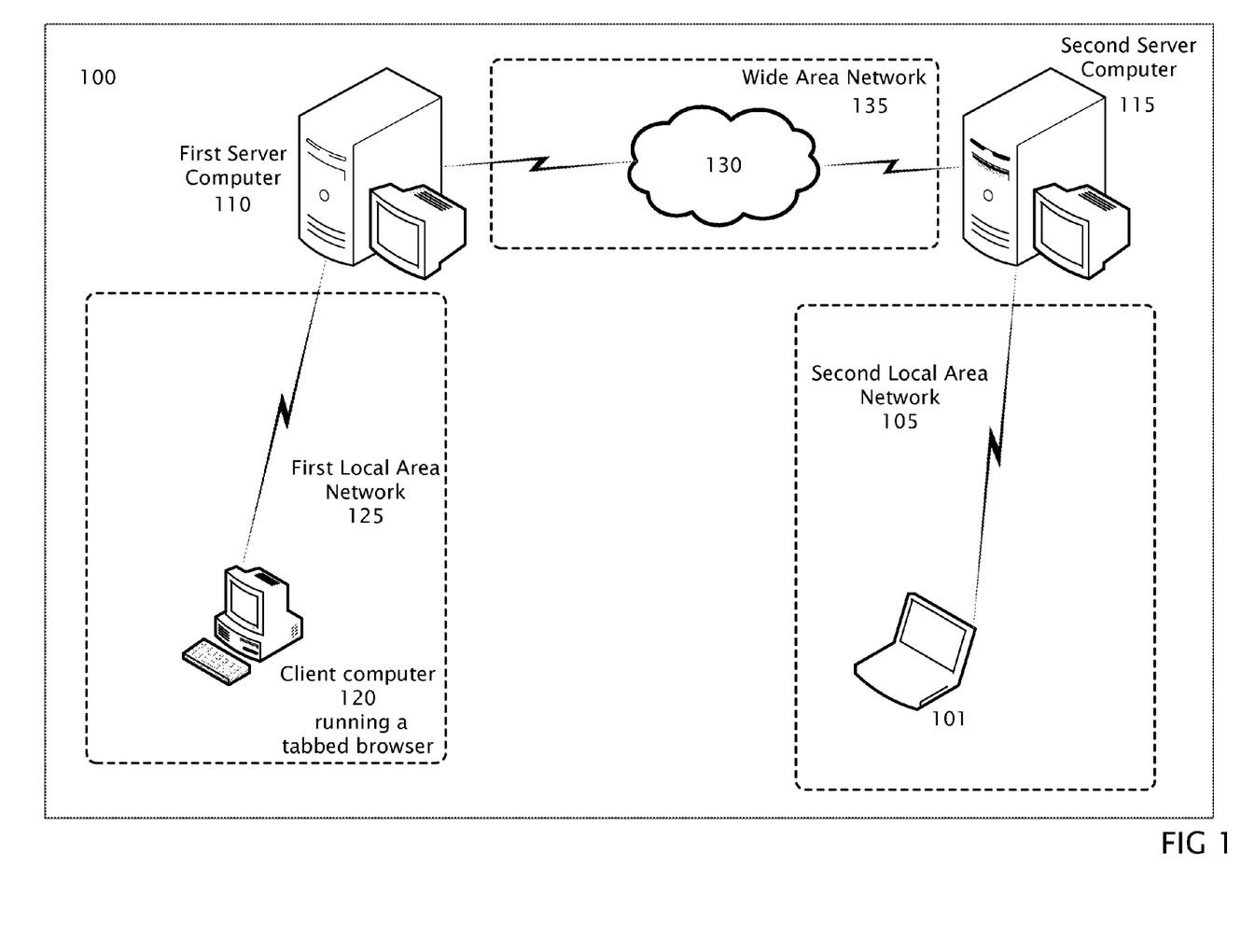
FIG. 1 is an exemplary conventional network utilizing a browser for Internet access.

FIG. 1 is an exemplary conventional network 100 utilizing a browser for Internet access. In this network a client computer 120 may run a tabbed browser to access the Internet. Client computer 120 may be coupled to a conventional first server computer 110 through a conventionally constructed first local area network 125.

First server computer 110 may be coupled to wide area network 135, which is conventionally constructed and may include the Internet 130 or equivalent coupling methods for providing wide area networking. As shown wide area network 135 is coupled to conventionally constructed second server computer 115. In this example, second server computer 115 is coupled to conventionally constructed computer 101 over a conventionally constructed second local area network 105.

Local area networks 125 and 105 may include a plurality of conventional computers (not shown) and conventional peripheral equipment (not shown) coupled together utilizing topologies (token ring, star and the like) and switching equipment known to those skilled in the art. Those skilled in the art may realize that other processor equipped devices such as televisions and VCRs with electronic program guides, cellular telephones, appliances and the like may be coupled to the networks utilizing conventional techniques known to those skilled in the art.

A typical local area network 105 or 125 may include a conventionally constructed ISP network in which a number or plurality of subscribers utilize telephone dial up, ISDN, DSL, cellular telephone, cable modem, or the like connections to couple their computer to one or more server computers 110 or 115 that provide a connection to the wide area network 135 via the Internet 130.

Client computers 101 or 120 may run a tabbed browser to access the Internet, which may include a web page served by software running on second server computer 115. The web page may include script or other executable instructions that could cause a dialog box to be display on client computer 120. Those skilled in the art may realize that the computers 101, 120 may be any number of devices, including a PC, cell phone, Internet appliance, set top box, hand-held computers, and the like.

Figure 2:
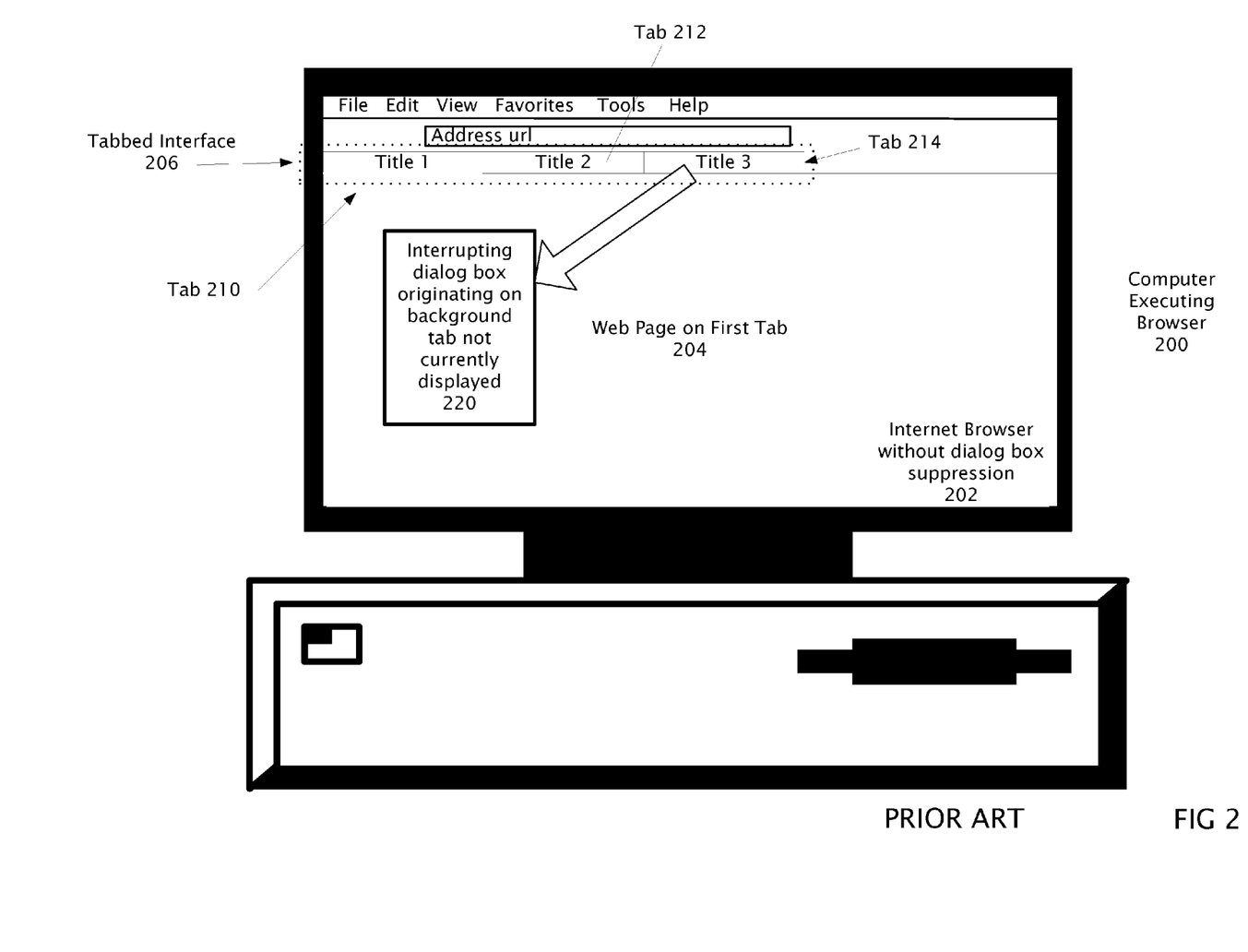
FIG. 2 shows a conventional computer running a conventional tabbed Internet browser and displaying a conventional dialog box generated from an associated background tab.

FIG. 2 shows a conventional computer 200 running a conventional tabbed Internet browser 202 and displaying a conventional dialog box 220 generated from an associated background tab.

Internet Browser without dialog box suppression 202 may have a tabbed interface 206 with multiple tabs. The example shows three tabs, the currently active tab 210, with the web page 204 on the first tab having a title in its tab "Title 1" displayed. The other tabs, Tab 212 and Tab 214, are on web pages not currently visible having titles "Title 2" and "Title 3" in the tabs respectively. These pages could be viewed by clicking on the appropriate tab on the tabbed interface 206.

While the pages on inactive tabs 212 and 214 are not visible, they may be continuing to execute any code such as initialization routines, client-side script and third-party control executable code that are on those pages. In this example, the page having tab 214 has encountered code that has brought up a dialog box 220. This dialog box tends to pop up and distract the user. This can be confusing to the user, since it may not be clear that the dialog box is not from the page he or she is currently viewing. It could also lead to security issues.

For example, a page the user is not currently viewing may pop up a dialog box asking for a user name and password and the user may think the dialog box is from the currently active tab. This could lead to incorrect information being entered, or worse, a malicious site gaining access to valid username and password information for another site. Aside from those kinds of risks, it typically leads to a poor user experience to have dialog boxes from inactive tabs displayed, interrupting what the user is doing on the currently active, and viewed web page.

Such a browser 202 could be run on any number of different hardware and software platforms, including but not limited to PCs, cell phones, Internet appliances, set top boxes, hand-held computers, etc.

The present example typically provides a way to prevent interruptions and provide a better user experience, by tending to provide a way to suppress dialog boxes from web pages on inactive tabs, until such time as those tabs become active or it is desired to access these pages.

Figure 3:
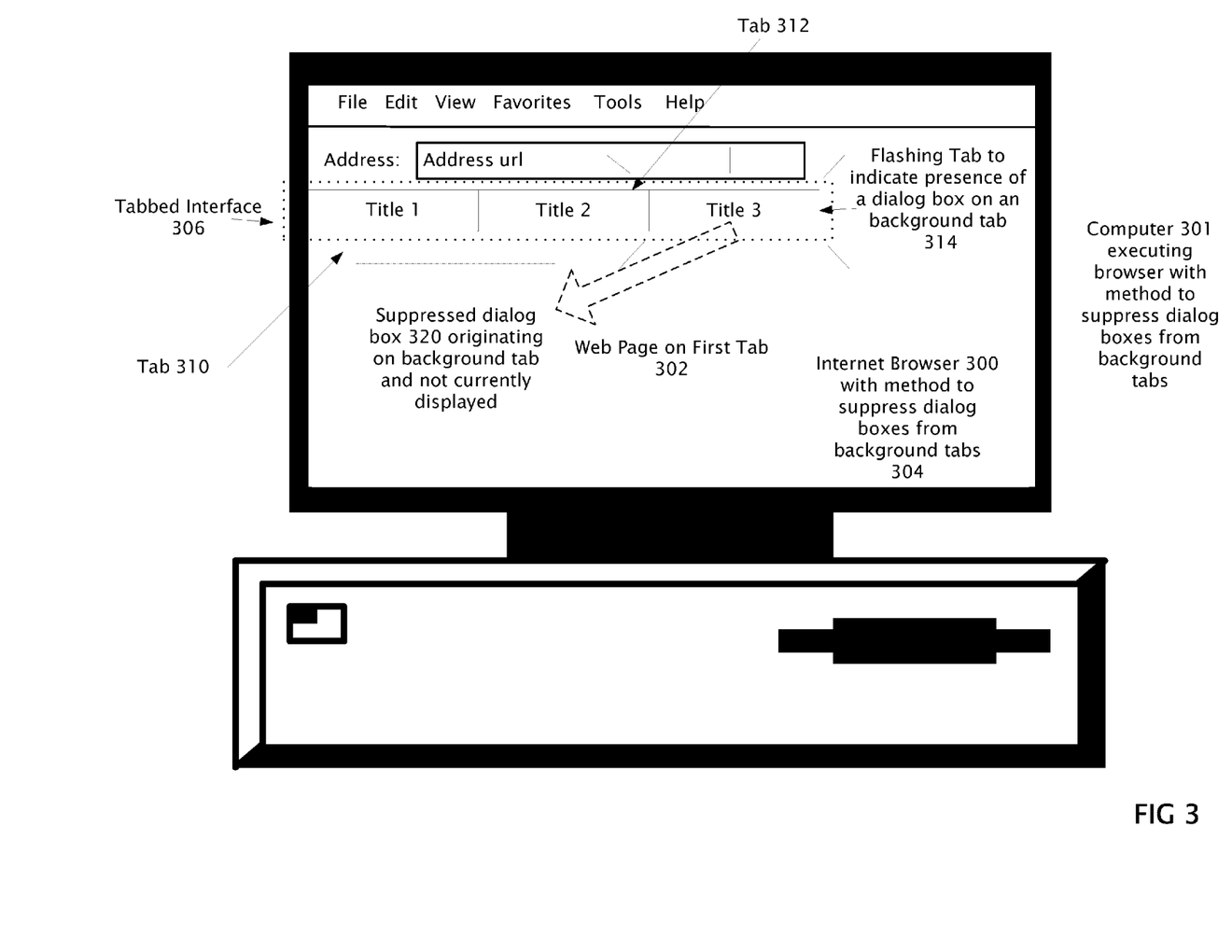
FIG. 3 shows a computer running a tabbed Internet browser including a method to suppress dialog boxes generated from background tabs and a method to indicate that a dialog box is present.

FIG. 3 shows a computer 301 running a tabbed Internet browser 300 including a method to suppress dialog boxes generated from background tabs 304 and a method to indicate that a dialog box is present. Internet browser 300 may have a tabbed interface 306. The tabbed interface may include a cue such as a flashing tab to notify a user that a dialog box is present. The three tabs 310, 312, and 314 are exemplary. A plurality of tabs may be present. Tab 310 is the currently active tab, with tab 312 and 314 having different web pages loaded and hidden from view. Tab 314 is shown flashing within the browser, indicating that there may be a suppressed dialog box 320 originating on a background tab not currently displayed, waiting to be displayed from the page loaded on that tab. A flashing indicator may also be provided outside the browser, such as from an operating system task bar or its equivalent. Flashing can mean a blinking light, backlighting the tab, or coloring the tab in alternating patterns. Other methods of cueing the user may also be substituted for flashing. The user can continue working on Tab 310 without interruption. Dialogs can cause interruption in the processing of information in the active tabbed window. However, with background tab suppression of the dialog box processing in the active window may continue uninterrupted.

Tab 310 is displaying a web page on first tab 302, with the title "Title 1." Tabs 312 and 314 have web pages titled "Title 2" and "Title 3" respectively, which are currently not visible. Any of the tabs could be activated, causing the page loaded on that tab to be displayed, by clicking on the appropriate tab in the tabbed interface 206. In order to suppress the dialog box 320 as shown, a method to suppress dialog boxes from view 304 may be incorporated into the browser software. If Tab 314 is clicked, the suppressed dialog box 320 would be displayed in the active window with the corresponding web page titled "Title 3."

Figure 4:
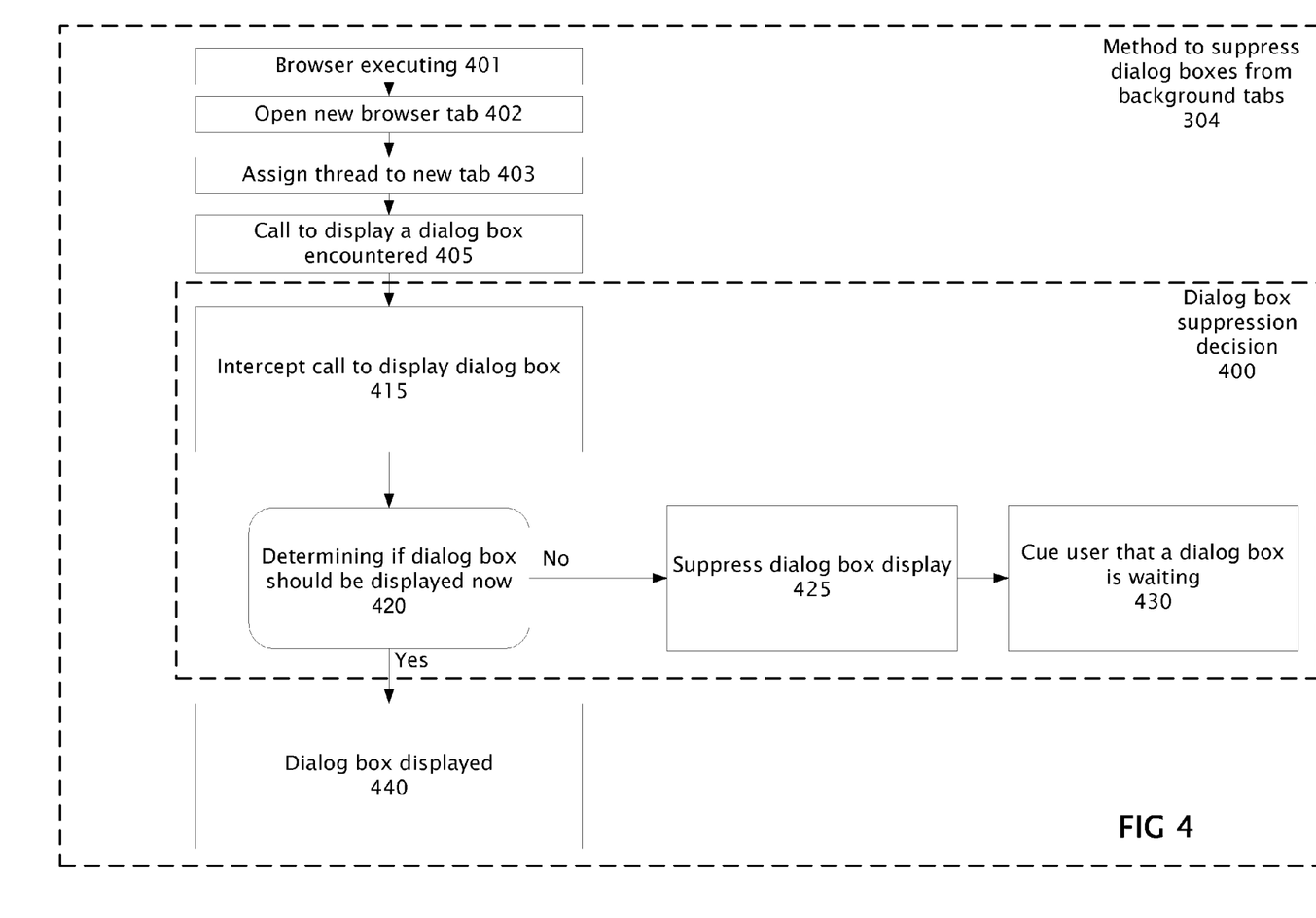
FIG. 4 shows a flow diagram showing a method to suppress dialog boxes from background tabs.

FIG. 4 shows a flow diagram showing a method to suppress dialog boxes from background tabs 304. At block 401, 402, 403 code is running via the browser, tab, control, or script execution process. A user or a web page may request a new browser tab to be opened 402. A new thread may be started and assigned for the new tab 403. A tab may make a call to an API to display a dialog box. At block 405, when the call to display a dialog box is encountered, the dialog box suppression decision logic 400 is invoked.

Block 400, dialog box suppression decision, comprises several steps. First, block 415 intercepts the call to display the dialog box. Block 420 determines if the dialog box should be displayed now. If the dialog box should be displayed now, block 440 may be executed and the dialog box is displayed.

If block 420 determines that the dialog box should not be displayed now, block 425 is invoked, suppressing the dialog box. Determining if the dialog box should or should not be displayed may be determined by examining the thread ID assigned to the tab in question and comparing it to known thread IDs. The known thread IDs may be maintained in a list, table, or their equivalent. Control may then be passed to block 430, which may cue the user that a dialog box is waiting to be displayed. A cue may be made, possibly by flashing the relevant tab 314 from FIG. 3 or other equivalent methods. One skilled in the art may recognize that other types of cues could be used indicate the suppressed dialog box, including other visual displays, or sounds such as audible beeps, signals from other devices, such as a Bluetooth enabled phone, or combinations of various indicators, or the like.

Figure 5:
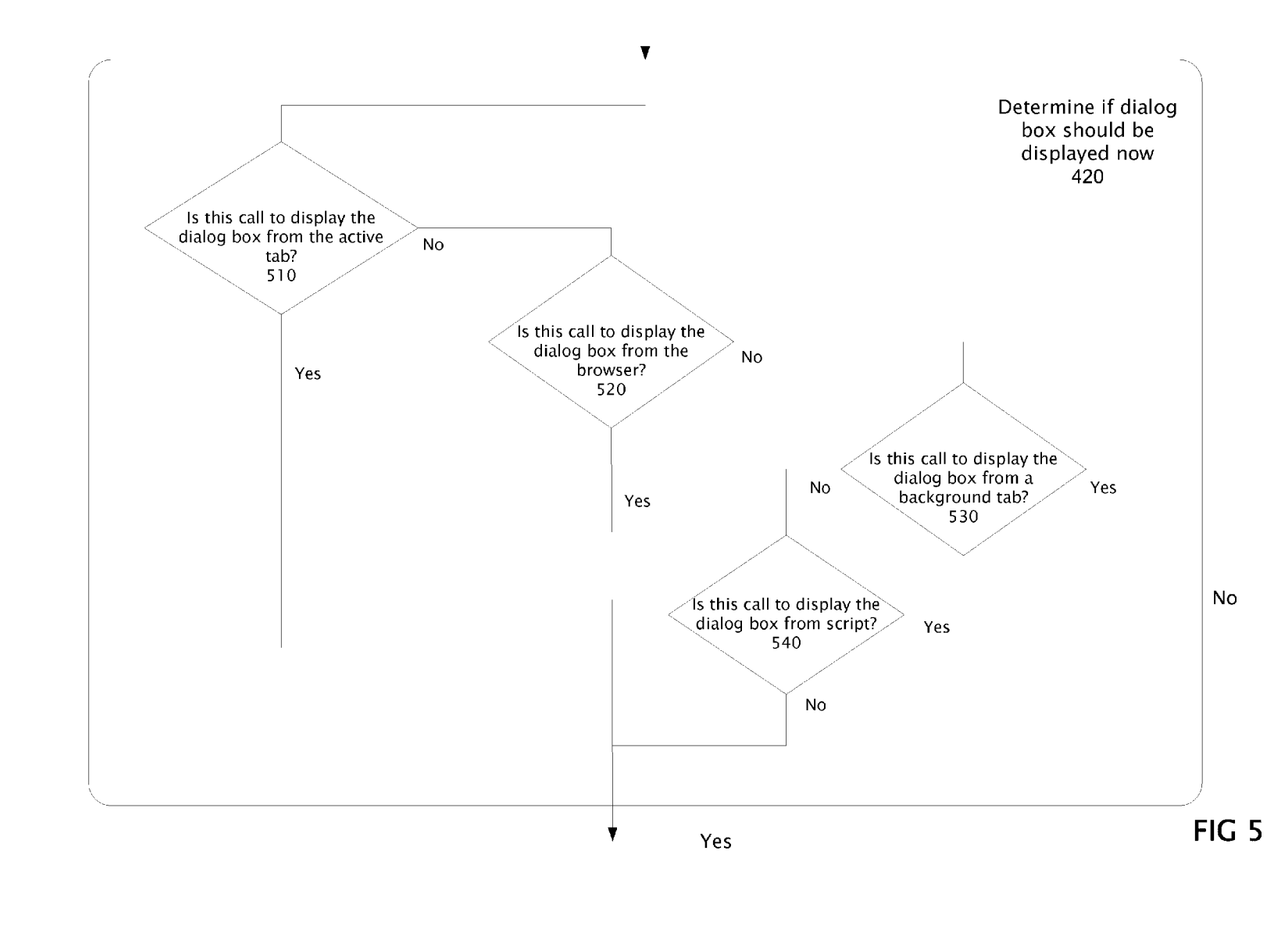
FIG. 5 shows a flow diagram providing additional detail on the block of determining if a dialog box should be displayed now.

FIG. 5 shows a flow diagram providing additional detail of block 420 determining if a dialog box should be displayed now. The procedure "determine if dialog box should be displayed now" 420 determines the source of the call to the dialog box (Block 415 on FIG. 4). First block 510 determines if the call came from the active tab. If it did (yes), the dialog box may be displayed (block 440 on FIG. 4). If not (no), block 520 checks to see if the call came from the browser. If it did (yes), the dialog box may be displayed (block 440 on FIG. 4). Otherwise (no), a block 530 determines if the call came from a background tab. If it did (yes), the dialog box display is suppressed (block 425 on FIG. 4). Otherwise, block 540 determines if the call came from script. If it did (yes), the dialog box is suppressed (block 425 on FIG. 4); if it did not (no), the dialog box is displayed (block 440 on FIG. 4). One skilled in the art may see that these tests could be performed in any order, and the list of conditions tested could be modified.

An example of determining where the call to display the dialog box came from involves using multiple threads within the browser. In such a case, each tab would be given a thread, as well as the browser or frame having one. The primary indicator may be the Thread ID of the thread that is attempting to show the dialog, which can be compared against the known Thread IDs of the tabs (and top-level window). In addition to threads, other indicators may include context such as the window handle being used to parent the dialog or a token previously assigned to the tab and passed along as context. These indicators may be used independently or in conjunction with threads or each other. The outcome of this evaluation may be: Background Tab, Active Tab, Frame (or Browser), or Unknown Source.

If the source of the dialog is found to be a Background Tab then the dialog may be queued by adding it to an internal list, along with an event for that dialog. After the dialog is queued, the source's thread may be blocked, waiting for the event to get signaled. The wait may use a "modal message loop" which is a method of blocking the thread while still processing a minimal set of Windows messages so that the UI thread is not completely hung, which could hang the entire application.

Next a message may be sent to the Tab Band signaling a dialog was suppressed. The Tab Band may respond by blinking the correct tab. When a tab is selected to make it active the list may be checked to see if any dialogs have been suppressed from that tab. If so the event to unblock the thread may be signaled, allowing the dialog to be shown, and then removed from the list.

If the source of the dialog is found to be an Unknown Source, meaning that the application is unable to associate the caller with any known tab, the dialog may be shown or blocked entirely based on the security risk of showing that dialog on top of the wrong tab. For example, if it is a script-initiated dialog from a web page it would be blocked to mitigate UI spoofing attacks, but if it is a dialog from an add-on within the application it would be allowed.

If the source of the dialog is found to be the Active Tab Thread or Frame Thread then the dialog may be shown right away.

One way to intercept the call to the "display dialog box" is to capture the call directly. For example, if a web page uses script to call an API within a browser to display a dialog box, the browser can directly examine the information in the call to the API to determine the source. Another way is to hook operating system APIs for showing dialogs, capturing any calls to the API and determine the caller before passing the call on to the original operating system routine.

Figure 6:
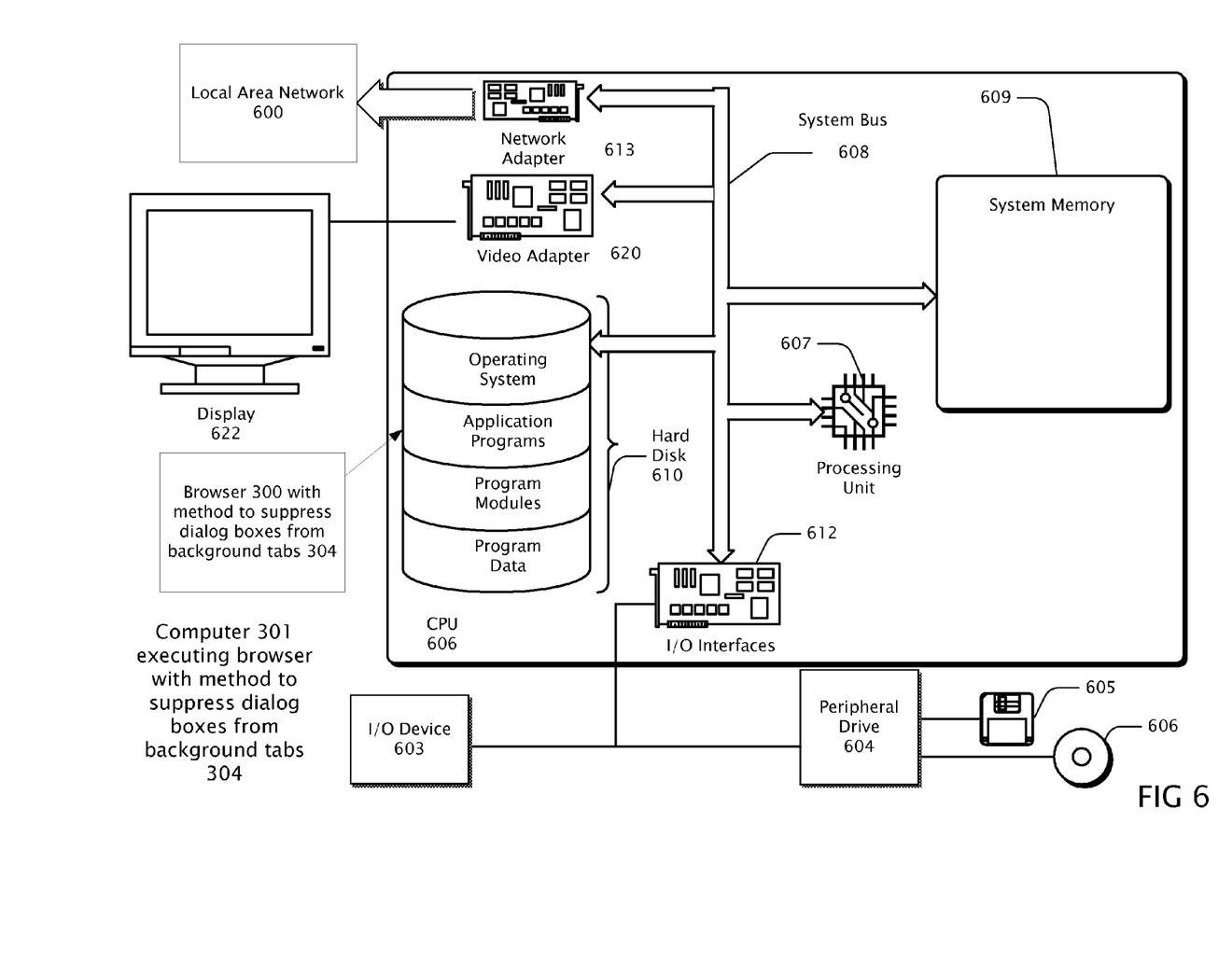
FIG. 6 is a block diagram of an exemplary computer in which a browser with a method to suppress dialog boxes from background tabs may be executed.

FIG. 6 is a block diagram of an exemplary computer 301 in which a browser with a method to suppress dialog boxes from background tabs may be executed. Exemplary computing environment 301 is only one example of a computing system and is not intended to limit the examples described in this application to this particular computing environment.

A peripheral drive 604 may accept a computer readable media 605, 606 that includes a copy of the method to suppress dialog boxes from background tabs. The peripheral drive may be coupled to an I/O interface 612 along with an I/O device 603.

The I/O interface 612 may be coupled to a bus structure 603, which also may couple to a hard disk 610, a processor 607, system memory 609, a video adapter 620 and a network adapter 613.

Video adapter 620 typically couples a display 622 to the CPU 606. Network adapter 613 typically couples a local area network 600 to the CPU 606.

For example the computer 301 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 301 includes a general-purpose computing system in the form of a CPU 606, display 622, I/O device 603, and peripheral drive 604. The CPU 606 can include one or more processors (including CPUs, GPUs, microprocessors and the like) 607, a conventional system memory 609, and a conventional system bus 608 that couples the various system components. Processor 607 processes various computer executable instructions, including those to control the operation of computing device 301 and allows communication with other electronic and computing devices (not shown). The system bus 608 represents any number of several types of bus structures, including a memory bus or memory controller, a peripheral bus, an accelerated graphics port, and a processor or local bus using any of a variety of bus architectures.

The system memory 609 may include computer-readable media in the form of volatile memory, such as random access memory (RAM), and/or non-volatile memory, such as read only memory (ROM). A basic input/output system (BIOS) is typically stored in ROM. RAM typically contains data and/or program modules that are immediately accessible to and/or presently operated on by one or more of the processors 607. Computing device 602 may include other removable/non removable, volatile/non-volatile computer storage media.

A hard disk drive 610 is also a type of computer readable media that may read from and write to a non-removable, non-volatile magnetic media (not shown). Such a hard disk 610 may include a magnetic disk drive which reads from and writes to a removable, non volatile magnetic disk (e.g., a "floppy disk") 605, or an optical disk drive that reads from and/or writes to a removable, non-volatile optical disk such as a CD ROM or the like. In this example, the hard disk drive 610, and disk drive 604 are each connected to the system bus 608 by one or more data media interfaces 612. The disk drives and associated computer readable media provide non volatile storage of computer readable instructions, data structures, program modules, and other data for computing device 301.

Mass storage devices (or peripheral drive) 604 are also a type of computer readable media that may be coupled to the computing device or incorporated into the computing device by coupling to the bus 608. Such peripheral drive 604 may include a magnetic disk drive which reads from and writes to a removable, non volatile magnetic disk (e.g., a "floppy disk") 605, or an optical disk drive that reads from and/or writes to a removable, non-volatile optical disk such as a CD ROM or the like 606. This mass storage device may be representative of those storing the image or those being backed up. In the example described above the plurality of backups and process for restoring backups (202 of FIG. 2), restore OS (204 of FIG. 2) may be disposed on the hard disk 610 or the system memory 609. Computer readable media ("CRM") 605, 606 typically embody computer readable instructions, data structures, program modules and the like supplied on floppy disks, CDs, portable memory sticks and the like. Such CRM may be used to produce an initialization disk.

Any number of program modules or processes can be stored on the hard disk 610, or peripheral drive 604, including by way of example, backup files, an operating system, one or more application programs, other program modules, and program data. Each of such operating system, application programs, other program modules and program data (or some combination thereof) may include an embodiment of the systems and methods described herein.

A display device 622 can be connected to the system bus 608 via an interface, such as a video adapter 620. A user can interface with the CPU 606 via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computer 301 can operate in a networked environment using connections to one or more remote computers through one or more local area networks (LANs), wide area networks (WANs) and the like. The computer 301 is connected to a network 600 via a network adapter 613 or alternatively by a modem, DSL, ISDN interface or the like.

The browser 300 with method to suppress dialog boxes from background tabs 304 may be disposed on Hard Disk 610, or on computer readable media disposed on Peripheral Drive 604, or the like. Browser 300 could also be disposed in System Memory 609 or any other type of computer readable media.

Figure 7:
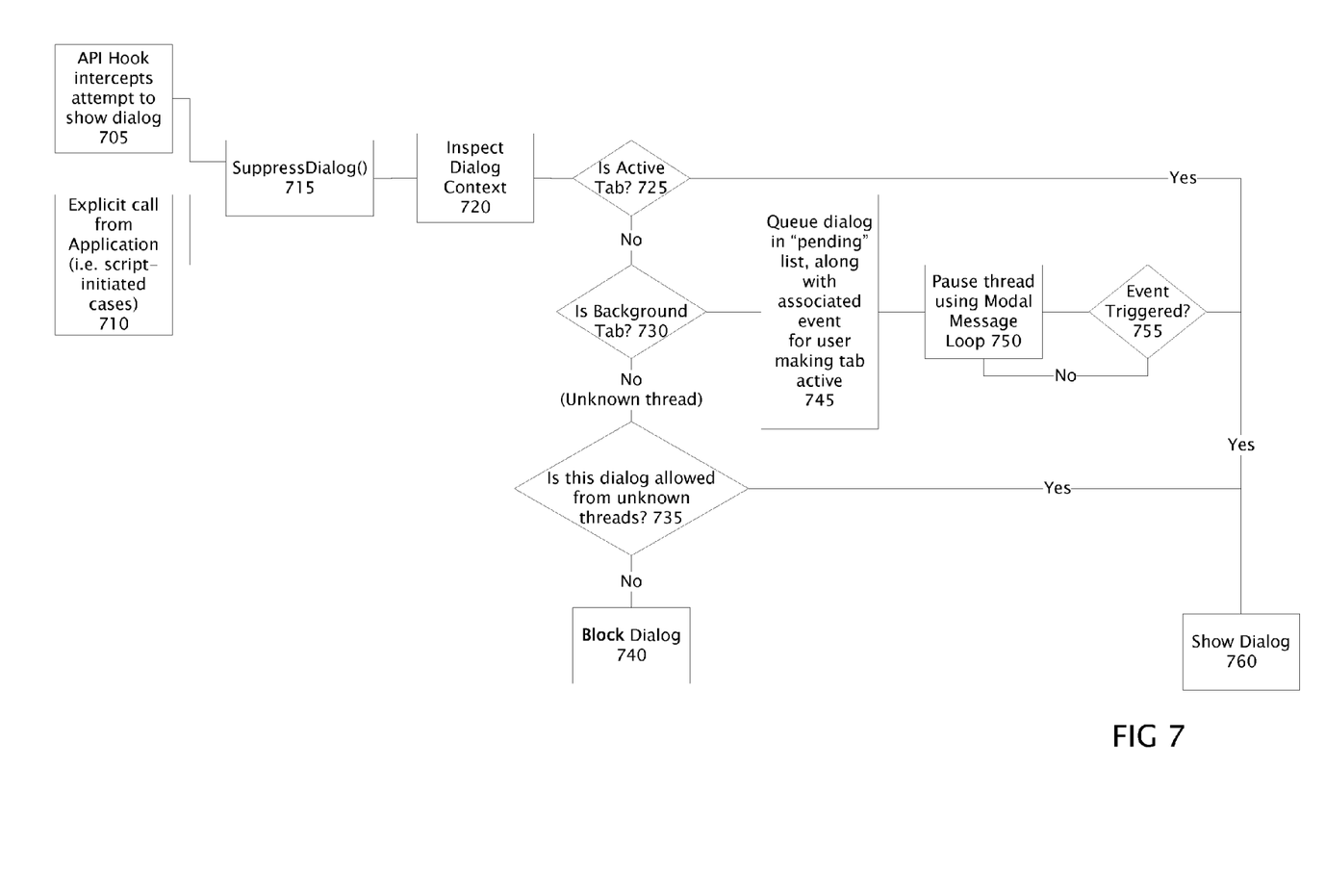
FIG. 7 is a flow diagram showing an alternate implementation of the method to suppress dialog boxes from background tabs.

FIG. 7 is a flow diagram showing an alternate implementation of the method to suppress dialog boxes from background tabs. At block 705, a hook into the operating system API may intercept an attempt to display a dialog box. Alternatively, in block 710, an executing script may call directly into a browser to display a dialog box. In each of these cases, a call may be made to a SuppressDialog method 715.

The context of the dialog may be inspected 720 to determine the source of the call. This may be done by comparing the thread ID to known thread IDs, by comparing the window handle to known window handles, or an equivalent method. If it is determined 725 that it is an active tab, the dialog box may be displayed 760. Otherwise, if it is a background tab 730, the dialog box may be queued in a pending list 745. The thread for that dialog may then be paused via a modal message loop 750 until an event is triggered 755. When the event is triggered 755, then the dialog may be shown 760. If the context 720 is not a background tab 730, the source may be unknown 735. If the dialog is allowed from unknown sources, the dialog box may be displayed 760. Otherwise, the dialog may be blocked 740.

This pseudo code may provide additional information for implementing the present example:

```
// Note: The parent HWND can be used as additional evidence for how to
// handle the dialog.
//
// dwFlags is used by the caller to control the behavior, such as whether
// this specific dialog can be shown from an unknown thread.
BOOL SuppressDialog(HWND hwndParent, DWORD dwFlags)
{
    DIALOG_CONTEXT context = GetDialogContext( );
    if (context == ACTIVE_TAB)
    {
        // Allow.
        return TRUE;
    }
    else if (context == UNKNOWN_THREAD)
    {
        if (dwFlags &
            ALLOW_THIS_DIALOG_FOR_UNKNOWN_THREADS)
        {
            // Allow.
            return TRUE;
        }
        else
        {
            // Block.
            return FALSE;
        }
    }
    else // if (context == BACKGROUND_TAB)
    {
        AddDialogToPendingList( );
        HEVENT hEvent = CreateEventForTabSwitch( );
        while (!IsEventSignalled(hEvent))
        {
            // Need to pump some messages to prevent hang.
            PumpMessages( );
        }
        // By the time we hit this line the tab is now active and
        // we can show the dialog.
        return TRUE;
    }
}
```

The invention claimed is:

1. A method of suppressing a user interface element comprising:

assigning a unique thread ID to each of a plurality of tabs displayed in a tabbed application;

determining the unique thread ID associated with an attempt to display a user interface element when the attempt to display the user interface element is being made, wherein the user interface element is a pop up dialog box;

using the unique thread ID to determine whether the user interface element is associated with an active tab that has an associated web page currently displayed, an inactive tab that has an associated web page hidden, or an unknown source by comparing the unique thread ID to data describing known thread IDs for the plurality of tabs;

enabling display of the user interface element when the user interface element is associated with the active tab that has the associated webpage currently displayed;

automatically without direct user intervention, suppressing display of the user interface element with a modal message loop when the user interface element is associated with the inactive tab that has the associated web page that is hidden, and later displaying the suppressed user interface element in response to a user selecting the inactive tab to cause the inactive tab to become active; and blocking display of the user interface element entirely when the user interface element is associated with the unknown source.

2. The method of suppressing a user interface element of claim 1 in which the tabbed application is a web browser.

3. A method of suppressing a user interface element from an inactive display comprising:

intercepting, by a web browser configured to implement a plurality of tabs, a request to display the user interface element, wherein the user interface element is a pop up dialog box;

ascertaining a thread id that is assigned to a source of the request, the source being one of said plurality of tabs;

determining whether the source of the request is an active display that is visibly displayed, an inactive display, or an unknown source by comparing the thread ID assigned to the source of the request to status indicators associated with known thread IDs;

displaying the user interface element when the source of the request for the user interface element is from an active display;

automatically without direct user intervention, suppressing the display of the user interface element using a modal message loop when the source of the request for the user interface element is from an inactive display and later displaying the user interface element in response to a user selecting the inactive display; and selectively blocking or displaying the user interface element based on a security risk associated with the user interface element when the source of the request for the user interface element is an unknown source.

4. The method of suppressing a user interface element from an inactive display of claim 3 in which the user will be signaled if the user interface element will be suppressed.

5. The method of suppressing a user interface element from an inactive display of claim 4 in which the signal is a flashing tab.

6. The method of suppressing a user interface element from an inactive display of claim 3 in which the web browser uses a plurality of threads and the plurality of tabs such that each of the plurality of tabs has a unique thread id.

7. One or more computer-readable media having executable instructions stored thereon, comprising:
- intercepting, by a web browser configured to implement a plurality of tabs, a request to display a user interface element from a display, wherein the user interface element is a pop up dialog box;
- ascertaining a thread id that is assigned to a source of the request, the source being one of said plurality of tabs;
- determining whether the source of the request is an active display that is currently displayed, an inactive display that is hidden, or an unknown source by comparing the thread ID assigned to the source of the request to status indicators associated with known thread IDs;
- displaying the user interface element when the source of the request for the user interface element is from the active display that is currently displayed; and
- automatically without direct user intervention, suppressing the display of the user interface element using a modal message loop when the source of the request for the user interface element is from the inactive display that is hidden and later displaying the user interface element in response to a user selecting the inactive display; and
- selectively blocking or displaying the user interface element based on a security risk associated with the user interface element, when the source of the request for the user interface element is an unknown source.

8. The one or more computer-readable media having executable instructions stored thereon of claim 7 in which the web browser uses a plurality of threads and the plurality of tabs such that each of the plurality of tabs has a unique thread id.

9. The one or more computer-readable media having executable instructions stored thereon of claim 8 in which the thread ID of the source of the request is used to determine the source of the request.

10. The one or more computer-readable media having executable instructions stored thereon of claim 7 in which the user will be signaled if the user interface element will be suppressed.

11. The one or more computer-readable media having executable instructions stored thereon of claim 10 in which the signal is a flashing tab.

12. The one or more computer-readable media having executable instructions stored thereon of claim 10 in which the signal is an audible beep.

* * * * *